March 22, 1938.　　　L. AVORIO　　　2,112,061
SUSPENSION OF PARACHUTES
Filed March 4, 1937　　　2 Sheets-Sheet 1
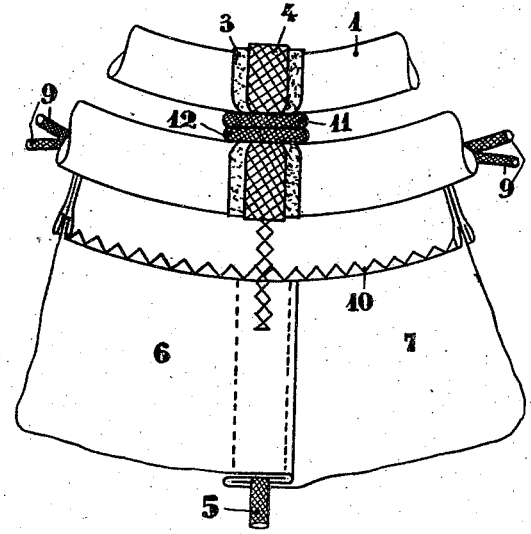
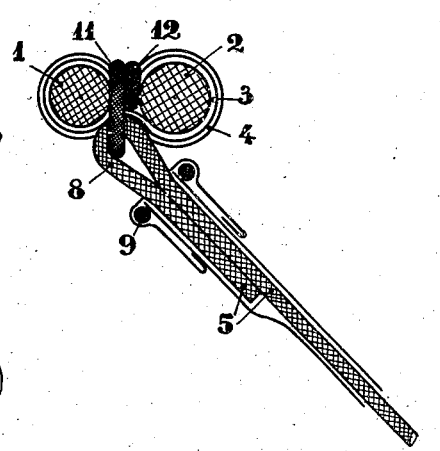
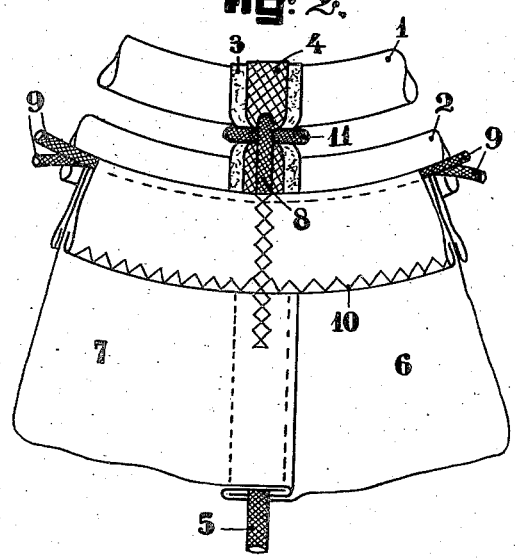
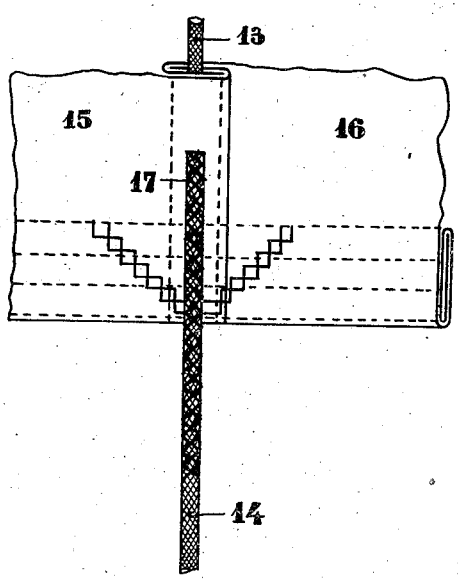
INVENTOR:
LUIGI AVORIO
BY Haseltine, Lake & Co.
ATTORNEYS March 22, 1938.                L. AVORIO                 2,112,061
                        SUSPENSION OF PARACHUTES
                   Filed March 4, 1937        2 Sheets-Sheet 2
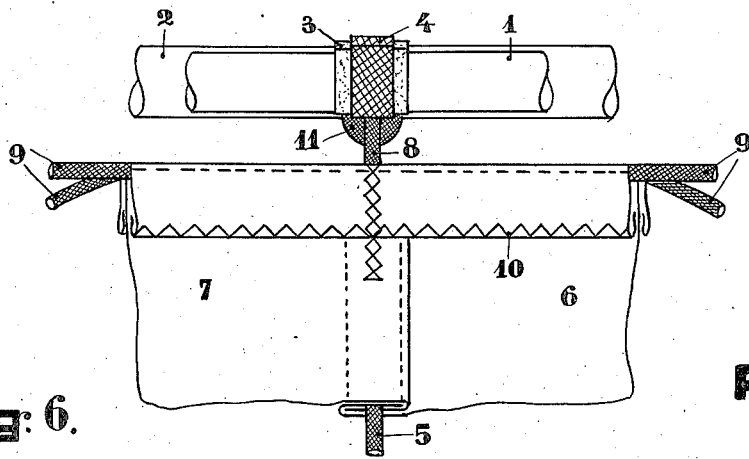
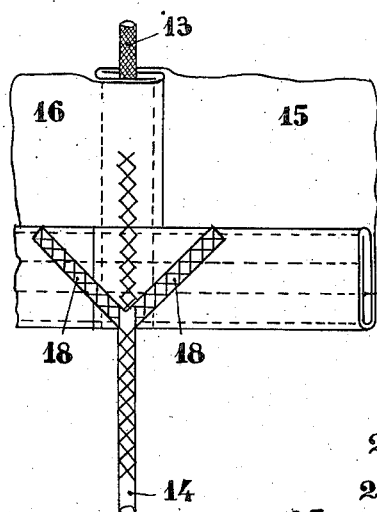
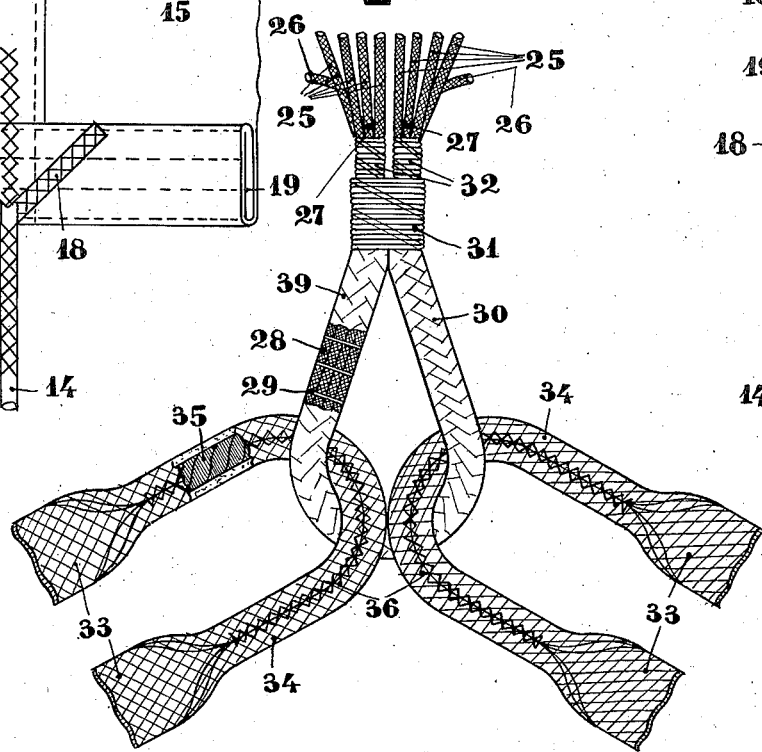
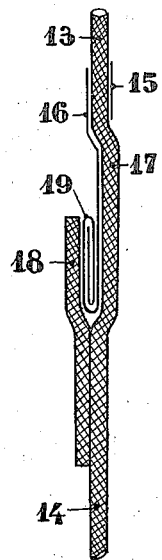
INVENTOR:
LUIGI AVORIO
BY Haseltine, Lake & Co.
ATTORNEYS Patented Mar. 22, 1938

2,112,061

UNITED STATES PATENT OFFICE 2,112,061

SUSPENSION OF PARACHUTES

Luigi Avorio, Rome, Italy, assignor to Aerostatica Avorio Società in Accomandita Semplice, a company of Italy Application March 4, 1937, Serial No. 128,883 In Italy March 6, 1936

5 Claims. (Cl. 244—145)

The improvements realized in the construction of aircraft, which up to a few years ago had attained an average speed of 250 kilometers per hour, have been such that at the present time an hourly velocity of 400 km. is attained with almost all types of planes.

The parachute, which is the only means of securing absolute safety in case of damage or mishap, has consequently had to be improved at the same rate as the aircraft so as to allow it to be launched from airplanes flying at a speed of 400 km. per hour, without causing damage to man and material, while ensuring its perfect working and without exceeding its normal weight.

The improvements made so far in parachute construction may be ascribed to the two different following conceptions; firstly, to reduce within permissible limits the strains produced by the present launching velocities from airplanes, this side of the question being outside of the field of the present invention; secondly, to cause the various portions of the parachute to be made sufficiently strong so as to resist the said so reduced new strains.

The present invention relates only to the suspension of the parachute.

Assuming that the resistance of a rope is constant, at some points thereof it is necessarily weaker owing to secondary strains occurring simultaneously as the axial tension, these secondary strains being produced by the knots and by changes of direction.

The suspension ropes, fixed on the canopy of the parachute, leading from the apex hole thereof, are continuous in their lower portion.

The first point of greater stress of the rope occurs consequently at its attachment in the apex hole. In order that this hole may operate correctly, the suspension rope with its attachment must produce in the elastic portion of the hole the necessary tension. The attachment must therefore insure this effect, but it must moreover insure the fixing of the rope thereon in case one of the elastic bands encircling the hole should break accidentally. These elastic bands are two or more so as to provide a greater degree of safety in the working, and it is necessary that they should be arranged concentrically in a plane when the parachute is folded in its casing.

The invention relates consequently to an attachment adapted to permit the flat disposition of the elastic rings, which latter insure the attachment of the other rings when one of them gives way, and lastly, that the canopy material and the suspension rope itself are not subjected to undue stresses and strains.

The accompanying drawing shows schematically and by way of example, some forms of realization of the improvements according to the invention:

Figures 1, 2, 3 and 4 show, partly in view and partly in section, the details of the upper attachment of a rope to the rings of the vent hole.

Figures 5, 6 and 7 show, partly in view and partly in section, the detail of the lower attachment of a rope between two contiguous ropes of the canopy.

Fig. 8 shows a type of reinforced rope, and

Fig. 9 shows the detail of the bundle of ropes to the suspension girdle.

In Figures 1, 2, 3 and 4 which show, by way of example, the attachment of a suspension rope, according to the principles above set forth, 1 and 2 are the elastic rings encircling the hole, 3 is a leather lining having the object of distributing the pressure exerted by the rope on the elastic rings. This lining of leather, or of other suitable material, is reinforced outside with a ribbon 4 made with silk, or with other material. The suspension rope 5 leading from the interior of the knitting of two successive ropes 6 and 7, forms an eyelet 8 passing in the middle of two small cables 9 knitted on the apex hole, which serve to limit the maximum deformation of said apex hole. The two ends of the rope 5, the ropes 6 and 7, and the two small cables 9, are strongly knitted one with the other, so as to insure the strength of the whole and to prevent any reciprocal movement. The knittings 10 on the apex hole border are made diagonally as shown in the figure, in order to allow a greater elongation to the material 6 and 7 of the canopy, to the hole and to the rings 1 and 2, without tearing up the said material. The eyelet of the suspension rope is fixed between the elastic rings 1 and 2, in correspondence with the lining 3 reinforced with the ribbon 4, by means of a contracting knot 11, which, by passing into the eyelet 8 of the suspension rope, surrounds the lining 3 and the corresponding reinforcement 4, constricting them one with another. If one or more turns 12 of the contracting knot 11 pass into the reinforced lining 3=4, so that even if one of the elastic bands 1=2 should give way, the sliding of the knot 11 is prevented, as well as the detachment of the suspension rope 5 from the unbroken elastic ring.

A second point of greater strain is that in which the suspension rope departs from the reinforced contour of the canopy of the parachute. In order that this attachment may prove sufficiently strong, the border of the canopy is reinforced with a tape or the like, and the suspension rope being lodged into the knitting of two consecutive ropes of the canopy, leaves the flap and fixes itself over this knitting. It may occur however that the edge of the canopy is folded on itself, and that the rope plied at an angle owing to wind pressure should tear up the canopy or should deteriorate itself thus impairing its strength. This latter contingency may be prevented by dropping the border of the canopy between the suspension rope and an added piece of rope without knot and superposed.

Figures 5, 6 and 7 show by way of example this attachment; the suspension rope 13 and 14, the portion 13 of which is inserted in the knitting of the consecutive ropes 15 and 16; and the section 14, which is the outer portion, leaves the knitting at 17; 18 being the piece of rope added from the opposite side from which the suspension rope 14 departs; this portion 18 being knitted on the rope 14 and on the reinforced edge 19 of the canopy. In order to maintain the flexibility of the canopy edge 19, the added rope 18 may be mounted as a V, as in the example shown in Fig. 6, or in any other way, and it may be made of silk, of linen, or of any other suitable elastic and flexible material.

The third point of greater stress corresponds to the lower ply of the suspension rope where a cutting strain occurs, and where, owing to the ply, the rope, in order to sustain the strain, is greatly deformed. The means employed to prevent this consists in materially strengthening this portion of the suspension rope. This latter, in order to prevent winding on itself, has a tubular shape having knitted edges, so that it is possible to lodge in its interior a rope of smaller diameter, made of suitable elastic and flexible material, this being obtained without reducing the resistance of the suspension rope, by suitably enlarging a mesh on the knitted edges. This is clearly shown in Fig. 9, in which 20 indicates a suspension rope reinforced in the portion 21, in which the lower ply occurs by means of the rope 22 introduced inside through the meshes 23 and 24 suitably enlarged.

Fig. 8 shows by way of example a practical arrangement of the lower eyelet of the suspension ropes; 25 show the various suspension ropes with the reinforcing rope portions 26. The various ropes are assembled in groups 27, and these into a single bundle 28 held in place by a suitable string binding 29, the whole being covered by a sock 30. The ends of the sock 30 are tightly bound with the taping 31, so as to prevent the relative movements of the groups 27, each of which is in its turn tightly bound with the tapes 32 so as to prevent the relative movements of the suspension ropes 25, as well as the sliding to the internal reinforcing rope portions with respect to the suspension ropes 25.

The resistant portion of the girdle carrying the parachutist is attached to the lower eyelet of the suspension ropes so constructed. This resistant part of the girdle is constructed with strong hemp tapes, which are knitted on the girdle made with leather or the like, and ending with two rings formed like the lower eyelet of the suspension ropes, and as the pull may occur at one side more than on the other side, these tape terminal rings must be independent one from the other. Figure 8 shows by way of example this new arrangement, in which 33 indicates four hemp tapes fixed to the girdle; these at the same side form the rings 34 reinforced in their interior by a rope 35. The whole is then tightly held together by a knitting of string 36.

I claim:

1. In a parachute forming when opened a canopy shaped structure wherein the material of the parachute defines a vent at the apex of the structure, at least two concentrically arranged circular elements normally positioned in the same plane and adapted to elastically constrict the walls of the canopy shaped structure in the neighborhood of the apex of the parachute to reduce the size of said vent, suspension ropes extending from the top of the canopy shaped structure, reinforced strap sections embracing said circular elements, locking means formed on each of said strap sections, and bights provided on the upper ends of the suspension ropes engaging said locking means.

2. A parachute as set forth in claim 1, characterized in that each suspension rope is continuous and has its ends fastened to the locking means of the strap sections at two diametrically opposed points.

3. A parachute as set forth in claim 1, characterized in that the lower edge of the parachute is formed with a reinforced seam, and having a rope extending therethrough, the rope portion within the seam being reinforced and attached thereto.

4. A parachute as set forth in claim 1, characterized in that the lower portion of each suspension rope comprises a bight which is reinforced by an additional cord section, both parts being secured together by a tape wound about the reinforced portion.

5. A parachute as set forth in claim 1, characterized in that the lower ends of the suspension ropes are formed with bights adapted to securely embrace and hold the corresponding ends of the harness of the aviator.

LUIGI AVORIO.